United States Patent
Suzuki

(10) Patent No.: US 7,044,563 B2
(45) Date of Patent: May 16, 2006

(54) WHEEL SUPPORTING ROLLER BEARING UNIT AND MANUFACTURING METHOD OF THE SAME

(75) Inventor: Hayato Suzuki, Greenwood, IN (US)

(73) Assignee: NSK Corporation, Ann Arbor, MI (US)

( * ) Notice: Subject to any disclaimer, the term of this patent is extended or adjusted under 35 U.S.C. 154(b) by 76 days.

(21) Appl. No.: 10/703,093

(22) Filed: Nov. 7, 2003

(65) Prior Publication Data

US 2005/0099058 A1 May 12, 2005

(51) Int. Cl.
*B60B 27/00* (2006.01)
*F16D 65/12* (2006.01)

(52) U.S. Cl. ........... 301/105.1; 188/18 A; 188/218 XL; 29/469

(58) Field of Classification Search ................. 301/6.1, 301/6.8, 105.1; 188/18 R, 18 A, 218 XL; 384/544; 29/898.07, 898.09, 469
See application file for complete search history.

(56) References Cited

U.S. PATENT DOCUMENTS

| | | | |
|---|---|---|---|
| 6,523,909 B1* | 2/2003 | Nakamura et al. | 301/105.1 |
| 6,666,303 B1* | 12/2003 | Torii et al. | 188/18 A |
| 2003/0025385 A1 | 2/2003 | Morimoto et al. | |

FOREIGN PATENT DOCUMENTS

| | | | |
|---|---|---|---|
| JP | 2003-25802 | | 1/2003 |
| JP | 2004197870 A | * | 7/2004 |

* cited by examiner

*Primary Examiner*—Russell D. Stormer
(74) *Attorney, Agent, or Firm*—Crowell & Moring LLP

(57) ABSTRACT

The serrated portions of the studs are fitted in those portions of the mounting holes 14 close to the other side face of the mounting flange 13b. Accordingly, the radially outer portion of the mounting flange 13b is deformed to the one side face. At the radially outer portion of the one side face and throughout the circumference, there is formed a taper face 28a, which is inclined the closer to the other side face as it goes the closer to the radially outer side. As a result, the aforementioned problem can be solved because the radially outer potion of the one side face does not protrude from a flat face 29 formed at the radially inner portion of the one side face even with that deformation. Moreover, the taper face 28a can be formed at a low cost by a lathe-turning.

12 Claims, 7 Drawing Sheets

WHEEL SUPPORTING ROLLER BEARING UNIT AND MANUFACTURING METHOD OF THE SAME

BACKGROUND OF THE INVENTION

1. Field of the Invention

This invention relates to improvements in a wheel supporting roller bearing unit for supporting a wheel or a braking rotor of an automobile and a method for manufacturing the roller bearing unit, and has an object to reduce the vibrations which will occur at a breaking time.

2. Background of the Invention

A wheel 1 of an automobile and a rotor 2 constructing a disk brake or a braking device are rotatably borne in a knuckle 3 constructing a suspension by the structure shown in FIG. 10, for example. To the portion of a circular bearing hole 4 formed in that knuckle 3, more specifically, there is fixed an outer ring 6 constructing a wheel supporting roller bearing unit 5 by a plurality of bolts 7. On the other hand, the wheel 1 and the rotor 2 are jointed and fixed to a hub body 8 constructing the wheel supporting roller bearing unit 5 by a plurality of studs 9 and nuts 40.

A plurality of rows of outer ring tracks 11a and 11b are formed in the inner circumference of the outer ring 6, and a joint flange 12 is formed in the outer circumference. This outer ring 6 is fixed to the knuckle 3 by jointing the joint flange 12 to the knuckle 3 by the individual bolts 7.

On the other hand, a mounting flange 13 is formed at a portion of the outer circumference of the hub body 8 and at the portion protruding from the outer end opening of the outer ring 6 (wherein the "outer" with respect to the axial direction means the transversely outer portion in the assembled state in the automobile, as located on the left-hand side of the individual Figures excepting FIG. 2, whereas the right-hand side of the individual Figures excepting FIG. 2, as located on the transversely central side in the assembled state in the automobile means the "inner" with respect to the axial direction). The wheel 1 and the rotor 2 are jointed and fixed to the one side face (i.e., on the outer side face in the shown example) of the mounting flange 13. At a plurality of circumferential portions of the mounting flange 13, therefore, mounting holes 14 individually extending through the two side faces of the mounting flange 13 are formed in the common circumference around the center axis a of the hub body 8. Moreover, serrated portions 15 are formed on the outer circumferences of the individual portion of the individual studs 9 from the intermediate portions to the root end portions (as located at the portions close to the right-hand end of FIG. 10), and externally threaded portions 17 are formed in the outer circumferences of the leading half portions (as located at the left-hand half portions of FIG. 10). By press-fitting the serrated portions 15 of the individual studs 9 into the inner circumferences of the individual mounting holes 14, moreover, the root end portions of the individual studs 9 are fixed in the mounting flange 13 while being prevented from rotating with respect to the mounting flange 13.

And, the rotor 2 is superposed over the one side face of the mounting flange 13, and the wheel 1 is superposed over the one side face of the rotor 2. In this state, moreover, the leading end portions of the individual studs 9 are inserted through through holes 16 formed in the wheel 1 and the rotor 2 and are protruded from the one side face of the wheel 1. The externally threaded portions 17 protruded from one side face of the wheel 1 and formed at the leading end portion of the studs 9 are further fastened by the nuts 10. With this construction, the wheel 1 and the rotor 2 are jointed and fixed to the one side face of the mounting flange 13. Here, the hub body 8 and an inner ring 18 to described in the following construct a hub 19.

On the other hand, an inner ring track 20a is formed in the outer circumference of the intermediate portion of the hub body 8 and at the portion confronting the outer ring track 11a or the outer one of the double-row outer ring tracks 11a and 11b. Moreover, the inner ring 18 constructing the hub 19 together with the hub body 8 is fitted and fixed on a radially reduced step portion 21 formed on the outer circumference of the inner end portion of the hub body 8. And, an inner ring track 20b formed in the outer circumference of the inner ring 18 confronts the inner one 11b of the double-row outer ring tracks 11a and 11b.

Between the individual outer ring tracks 11a and 11b and the individual inner ring tracks 20a and 20b, pluralities of balls 22 and 22 or rollers are individually rotatably held in retainers 23 and 23. This construction the double-row angular type ball bearings of back assembly to bear the hub 19 rotatably on the inner side of the outer ring 6 while bearing the radial load and the thrust load. Here, seal rings 24a and 24b are sandwiched between the intermediate portion outer circumference of the hub body 8 and the inner end portion outer circumference of the inner ring 18 to block the inside space having the individual balls 22 and 22 and the outside. Moreover, the shown example is directed to the wheel supporting roller bearing unit 5 for the drive wheel (e.g., the rear wheels of an FR car and an RR car, the front wheels of an FF car or all the wheels of a 4WD car), so that a spline hole 25 is formed at the center portion of the hub body 8. And, a spline shaft 27 of a synchromesh joint 26 is inserted into that spline hole 25.

At the time of using the aforementioned wheel roller bearing unit 5, as shown in FIG. 10, the outer ring 6 is fixed in the knuckle 3, and the wheel 1 combined with the not-shown tire and the rotor 2 are fixed on the mounting flange 13 of the hub body 8. On the other hand, the rotor 2 and the not-shown support and caliper, as fixed in the knuckle 3, are combined to construct a braking disk brake. At the braking time, the paired pads across the rotor 2 are pushed onto the two side faces of the rotor 2.

On the other hand, it is known that the vibrations accompanied by uncomfortable noises, as called the "judder" occur at the braking time of the automobile. Various causes for these vibrations are known to come from the heterogeneous friction state between the side face of the rotor 2 and the linking of the pad. However, the deflection of the rotor 2 is known as a major cause. Specifically, the side face of the rotor 2 should be intrinsically at a right angle with respect to the center of rotation a of the rotor 2. However, the complete squareness is difficult due to the unavoidable manufacturing error or the like. As a result, the side face of the rotor cannot avoid more or less deflections in the direction of the rotating shaft (i.e., in the transverse direction of FIG. 10) at the driving time of the automobile. When the deflections (i.e., the transverse displacement of FIG. 10) become large, the aforementioned judder occurs when the linings of the paired pads are pushed for the braking action to the two side faces of the rotor 2.

In order to prevent the judder from occurring for those causes, it is important to suppress (or improve) the deflections of the side face of the rotor 2 (i.e., the axial deflections). In order to suppress these deflections, moreover, it is important to improve the squareness of the mounting face of the mounting flange 13 (i.e., the one side face of the mounting flange 13) with respect to the rotation center a of the hub body 8, and to retain the shaping accuracy of the mounting face sufficiently.

As the serrated portions 15 formed on the outer circumferences of the root end portions of the studs 9 are press-fitted into the mounting holes 14 formed in the mounting flange 13 so as to fix the rotor 2 on the mounting face of the mounting flange 13, however, the portions near the end portions of the individual mounting holes 14 in the mounting face of the mounting flange 13 may be deformed to bulge. By these deformations, moreover, the deflections of the rotor 2 jointed and fixed to the mounting face are liable to become larger.

In view of these circumstances, JP-A-2003-25802 describes the technique considering the deformations of the mounting face of the mounting flange, as caused by press-fitting and fixing the studs in the mounting flange. In the related art described in JP-A-2003-25802, as shown in FIG. 11, a taper face 28 is formed at such a portion of the mounting flange 13a as is close to the radially outer side of its one side face of the mounting flange 13a and as reaches the outer circumference edge of the mounting flange 13a, and is inclined in such a direction, before the serrated portions 15 (as referred to FIG. 10) of the studs 9 are press-fitted into the individual mounting holes 14, that it comes the closer to the other side face of the mounting flange 13a as it goes the farther to the radially outer side. The inclination angle of the taper face 28 with respect to the virtual plane at a right angle to the center axis of the hub becomes gentler in accordance with the press-fit of the serrated portions into the individual mounting holes 14.

Even in case the portion formed in the taper face 28 is deformed axially outward as the serrated portions 15 of the studs 9 are inserted into the individual mounting holes 14, according to the structure described in JP-A-2003-25802, that portion protrudes less axially outward than the radially inner portion. Therefore, the deformation based on the press-fit hardly leads to the axial deflection of the side face of the rotor 2 (as referred to FIG. 10), which is supported and fixed on the one side face of the mounting flange 13a.

However, our experiments have revealed that the deformation of the mounting flange 13a accompanying the press-fit of the serrated portions 15 of the studs 9 into the individual mounting holes 14 occurs not only at the radially outer portion of the circumscribed circle of the individual mounting holes 14 but also at the radially inner portion than the circumscribed circle. In order to effectively suppress the axial deflection of the side face of the rotor 2 due to the deformation of the mounting flange 13a accompanying the press-fit, therefore, the structure described in JP-A-2003-25802 is insufficient. On the one side face of the mounting flange 13a, more specifically, the radially inner portion than the circumscribed circle protrudes axially outward so that the side face of the rotor 2 jointed and fixed to that one side face deflects in the axial direction to generate the vibrations accompanied by uncomfortable noises, as called the "judder".

JP-A-2003-25802 also describes the structure, in which a taper face inclined the closer to the other side face of the mounting flange as it goes the closer to the radially outer side of the mounting flange is formed around each of the mounting holes in the one side face of the mounting flange and concentrically of each of the mounting holes. According to this structure, the axial deflections, as caused by the deformation of the mounting flange as the serrated portions of the studs are press-fitted into the individual mounting holes, of the side face of the rotor jointed and fixed to the one side face of the mounting flange can be more effectively suppressed. However, the working to form the taper faces around and concentrically of the individual mounting holes is troublesome to raise the manufacturing cost of the wheel supporting roller bearing unit.

SUMMARY OF THE INVENTION

In view of the background thus far described, an object of the present invention is to provide a wheel supporting roller bearing unit and a method for manufacturing the roller bearing unit capable of obtaining, by an easy working and at a low cost, a structure, which is enabled to suppress the deformation of a mounting flange, as might otherwise accompany the press-fit of the serrated portions of the studs into the individual mounting holes, more reliably thereby to suppress the axial deflection of the side face of the rotor due to that deformation.

A wheel supporting roller bearing unit, to which the invention is applied, comprises a hub, a plurality of mounting holes and a plurality of studs.

Of these components, the hub has a mounting flange on its outer circumference and rotates when it is used.

On the other hand, the individual mounting holes are so formed partially of the mounting flange that they extend axially through the mounting flange.

On the other hand, the individual studs are fixed on the mounting flange by press-fitting them into the individual mounting holes.

In use, moreover, a disk brake rotor is jointed and fixed while being superposed over one side face of the mounting flange by flanged portions formed at the root end portions of the individual studs and nuts fastened to the leading end portions of the individual studs.

Especially in the wheel supporting roller bearing unit, a portion close to the outer circumference of the one side face and reaching the outer circumference edge of the mounting flange is a taper face extending throughout the circumference of the mounting flange and inclined in a predetermined direction before the individual studs are press-fitted and fixed in the individual mounting holes. In this predetermined direction. The inclination angle of the taper face with respect to the virtual plane at a right angle with respect to the center axis of the hub becomes gentler in accordance with the press-fit of the individual studs into the individual mounting holes. Moreover, the inner circumference edge of the taper face exists between the circumscribed circle and the inscribed circle of the individual mounting holes.

In a method of the invention for manufacturing the wheel supporting roller bearing unit, on the other hand, there are measured the direction and extent of the deformation, as caused by press-fitting the individual studs into the individual mounting holes, of the radially outer portion of the one side face of the mounting flange. And, the mounting flange of another wheel supporting roller bearing unit, in which the individual studs are press-fitted under the identical conditions into the individual mounting holes, on its one side at the radially outer portion to reach the outer circumference edge of the mounting flange and throughout the circumference of the mounting flange, is machined before the individual studs are press-fitted into the individual mounting holes, thereby to form a taper face inclined oppositely of the deformation direction and having its inner circumference edge existing between the circumscribed circle and the inscribed circle of the individual mounting holes and reaching the outer circumference edge of the mounting flange. After this, the individual studs are press-fitted into the individual mounting holes.

According to the wheel supporting roller bearing unit and its manufacturing method of the invention thus constructed, the taper face inclined in the proper direction is formed in the proper position so that the deformation of the mounting flange, as might otherwise be caused by the press-fit of the studs into the individual mounting holes, can be reliably suppressed to suppress the axial deflections of the side face of the rotor due to the deformations, effectively. Moreover, the taper face is formed throughout the circumference of the mounting flange so that the structure allowing the taper face to be easily worked while suppressing the deflections can be obtained at a low cost.

In a specific structure of the invention, the serrated portions formed at the intermediate portions and close to the root ends of the individual studs are press-fitted at the positions offset with respect to the thickness direction of the mounting flange from the center to the other side face of the mounting flange. In this case, the taper face is inclined in such a direction as to come the closer to the other side face, i.e., apart from the rotor as it goes the more radially outward.

In this case, the distance, as taken in the thickness direction of the mounting flange, between a virtual plane extending radially outward from the radially inner portion of the one side face of the mounting flange and the outer circumference edge of the taper face is determined within a range of 10 to 70 microns (μm) according to the deformation of the mounting flange, as based on the press-fit of the studs into the individual mounting holes.

Alternatively, the serrated portions formed at the intermediate portions and close to the root ends of the individual studs are press-fitted at the positions offset with respect to the thickness direction of the mounting flange from the center to the one side face of the mounting flange. In this case, the taper face is inclined in such a direction as to leave the farther from the other side face of the mounting flange, i.e., the closer to the rotor as it goes the more radially outward.

On the other hand, the working operation for forming the taper face is performed by a lathe-turning after the components of the roller bearing unit excepting the individual studs were assembled up and before the serrated portions of the individual studs are press-fitted and fixed in the individual mounting holes.

[Additional Inventions]

Further, the above-mentioned object can be attained by, a wheel supporting roller bearing unit according to the present invention comprises a hub and a plurality of studs. The hub includes a mounting flange on its outer circumference. The mounting flange has a plurality of mounting through holes. The plurality of studs are respectively press-fitted in the mounting through holes. Each stud has a flanged portion at its root end portion and has a threaded leading end portion, in such manner that a disk brake rotor superposed over one side face of the mounting flange can be jointed and fixed by threadedly engaging the threaded leading end portions of the studs with nuts respectively.

In the unit according to the present invention, the mounting flange has a portion on which the rotor is superposed, the portion is close to the outer circumference edge of the one side face and reaches the outer circumference edge of the mounting flange, and the portion includes a taper face extending throughout the circumference of the mounting flange. Further, in the unit, the taper face is inclined in such a direction prior to the individual studs being press-fitted and fixed in the individual mounting holes that the taper face tapers away from or close to the rotor. Furthermore, the inner circumference edge of the taper face exists between the circumscribed circle and the inscribed circle of the individual mounting holes.

In addition to this, the above-mentioned object can also be solved by, according to the present invention, a method for manufacturing a wheel supporting roller bearing unit including: a hub having a mounting flange on its outer circumference for rotating when in use; a plurality of mounting holes formed partially of the mounting flange and extending axially through the mounting flange; a plurality of studs adapted to be press-fitted and fixed in the individual mounting holes, so that a disk brake rotor superposed over one side face of the mounting flange is jointed and fixed for use to the mounting flange with flanged portions formed at the root end portions of the individual studs and nuts fastened to the leading end portions of the individual studs. The method comprises:

measuring a direction and extent of a deformation, as caused by press-fitting the individual studs into the individual mounting holes, of the radially outer portion of the one side face of the mounting flange;

machining the mounting flange of another wheel supporting roller bearing unit, in which the individual studs are press-fitted under the identical conditions into the individual mounting holes, on its one side at the radially outer portion to reach the outer circumference edge of the mounting flange and throughout the circumference of the mounting flange, before the individual studs are press-fitted into the individual mounting holes, thereby to form a taper face inclined oppositely of the deformation direction and having its inner circumference edge existing between the circumscribed circle and the inscribed circle of the individual mounting holes and reaching the outer circumference edge of the mounting flange; and subsequently press-fitting and fixing the individual studs into the individual mounting holes.

Moreover, the above-mentioned object can be achieved by, according to the present invention, a wheel supporting roller bearing unit comprises:

a hub including a mounting flange with a plurality of mounting through holes; and a plurality of studs to be press-fitted in the mounting through holes respectively, each stud having a flanged portion at its root end portion and having a threaded leading end portion, in such manner that a disk brake rotor superposed over a side face of the mounting flange can be jointed and fixed by threadedly engaging the threaded leading end portions of the studs with nuts respectively, wherein the mounting flange has a tapered surface formed on its the side face, and the mounting flange is operable to effect a deformation caused when press-fitting the studs to the holes during assembly.

DETAILED DESCRIPTION OF THE PREFERRED EMBODIMENTS

Embodiment 1

Figure 10:
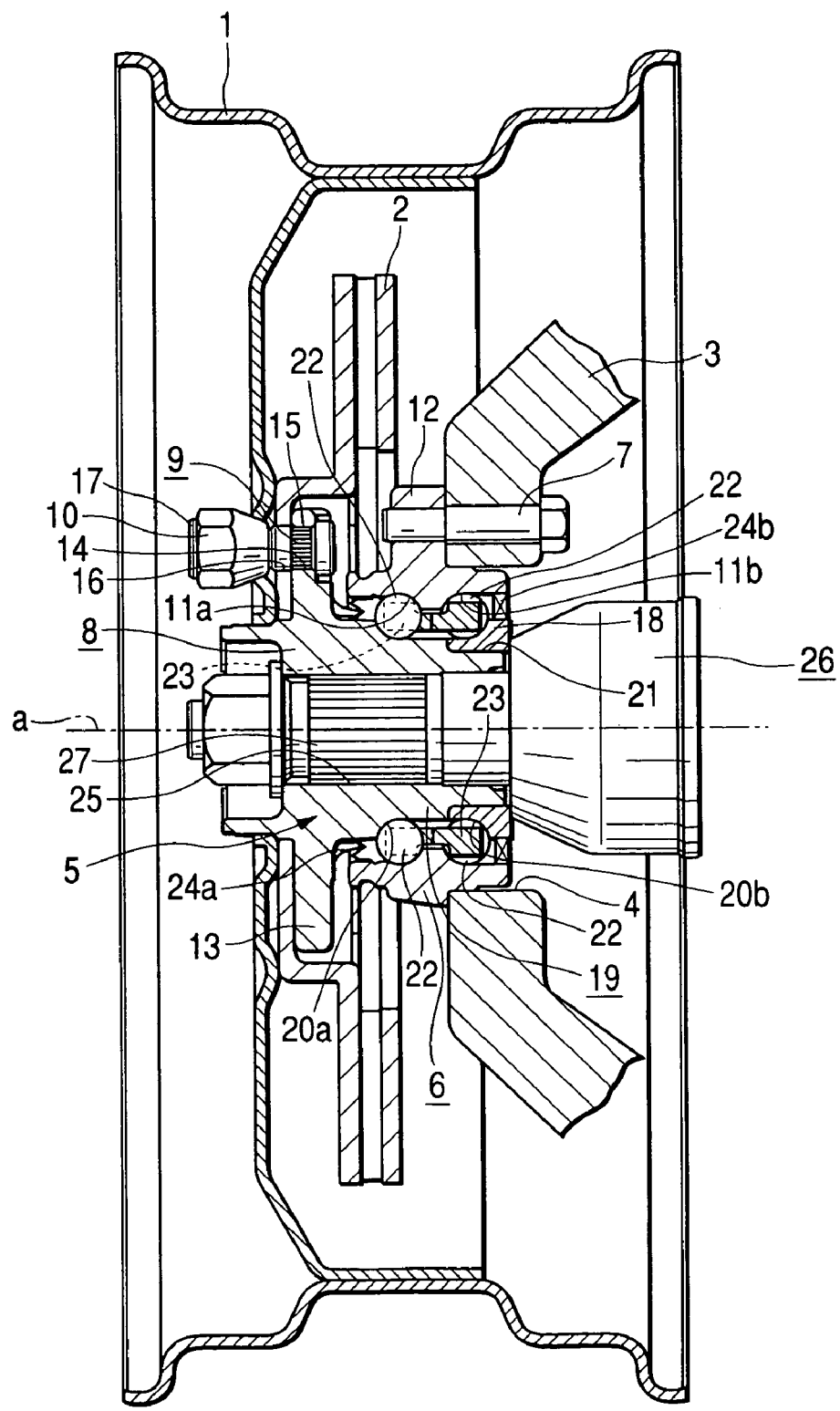
FIG. 10 is a sectional view showing one example of the used state of a wheel supporting roller bearing unit, to which the invention is applied.
Figure 11:
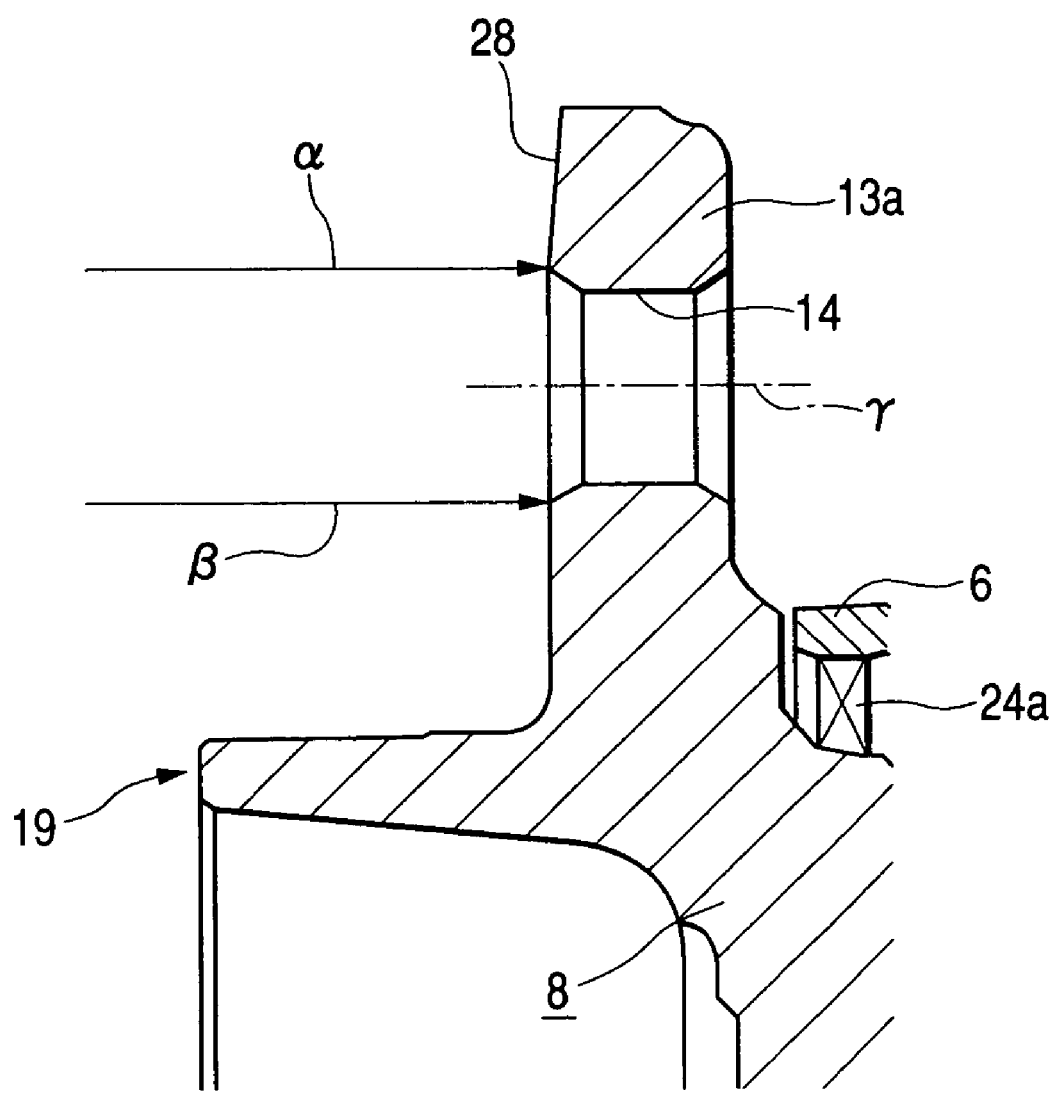
FIG. 11 is a sectional view showing a portion of one example of the conventional structure.

FIGS. 1 to 4 show Embodiments 1 to 4 of the invention. Here, the invention is characterized in the following point. Even in case a mounting flange 13b of a hub body 8 constructing a hub 19 is deformed as the serrated portions 15 of studs 9 are individually press-fitted into a plurality of mounting holes 14 and 14 formed in the mounting flange 13b, a rotor 10 (FIG. 10) jointed and fixed to the mounting flange 13b is prevented from having its side face deflected in the axial direction. The constructions and actions of the remaining portions are similar to those of the aforementioned structure shown in FIG. 10. Therefore, the illustrations and descriptions of the similar portions will be omitted or simplified, and the following description will be centralized in the characterizing portions of the invention.

Before the serrated portions 15 of the studs 9 are press-fitted into the individual mounting holes 14 and 14, a taper face 28a is formed at such a portion of the mounting flange 13b throughout the entire circumference of the mounting flange 13b as is close to the radially outer side of its one side face (or its outer side face) and as reaches the outer circumference edge of the mounting flange 13b. This taper face 28a is inclined in such a direction, before the serrated portions 15 are press-fitted into the individual mounting holes 14 and 14, that it comes the closer to the other side face (or the inner side face) of the mounting flange 13b as it goes the farther to the radially outer side of the mounting flange 13b. In the case of this embodiment, the inner circumference edge of the taper face 28a is located just intermediate between the circumscribed circle α and the inscribed circle β of the individual mounting holes 14 and 14 and at the portion of a pitch circle γ of those individual mounting holes 14 and 14. On the other hand, one side face of the mounting flange 13b, as located at a radially inner side than the inner circumference edge of the taper face 28a, is formed into a flat face 29, which extends at a right angle with respect to the center axis of the hub body 8. Moreover, the distance δ, as taken in the thickness direction of the mounting flange 13b, between a virtual plane x extending radially outward from that flat face 29 and the outer circumference edge of the taper face 28a is determined within a range of 10 to 70 microns (μm) according to the deformation of the mounting flange 13b, as based on the press-fit of the serrated portions 15 into the individual mounting holes 14 and 14.

Figure 1:
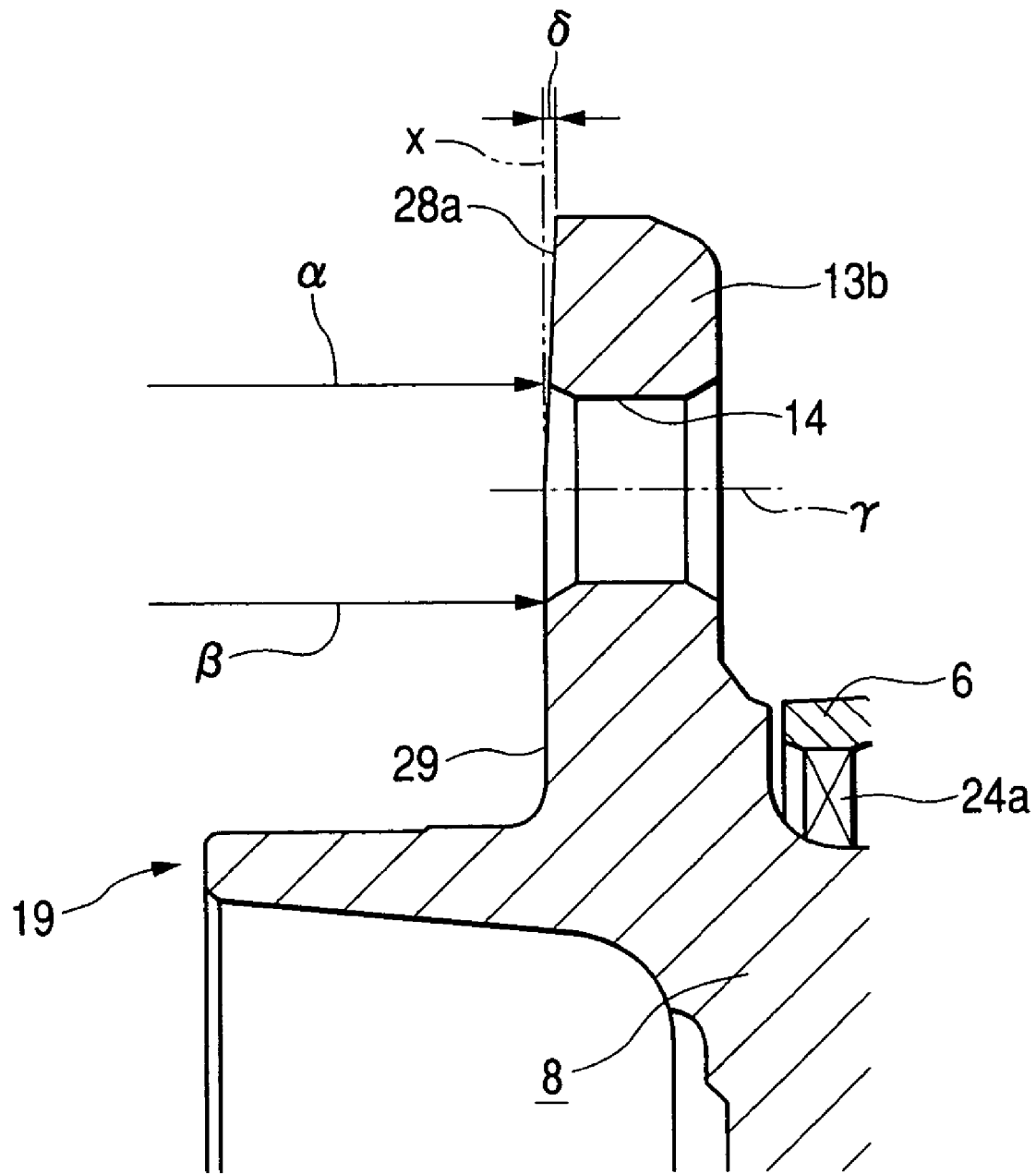
FIG. 1 is a sectional view showing a portion of Embodiment 1 of the invention.
Figure 2:
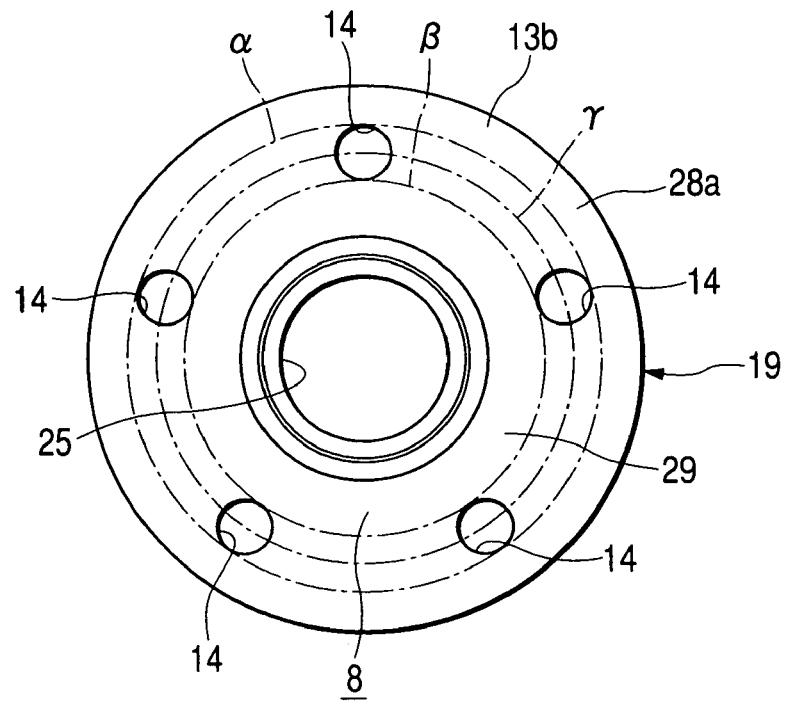
FIG. 2 is a view showing the hub entirety of the same and taken from the left-hand side of FIG. 1.
Figure 3:
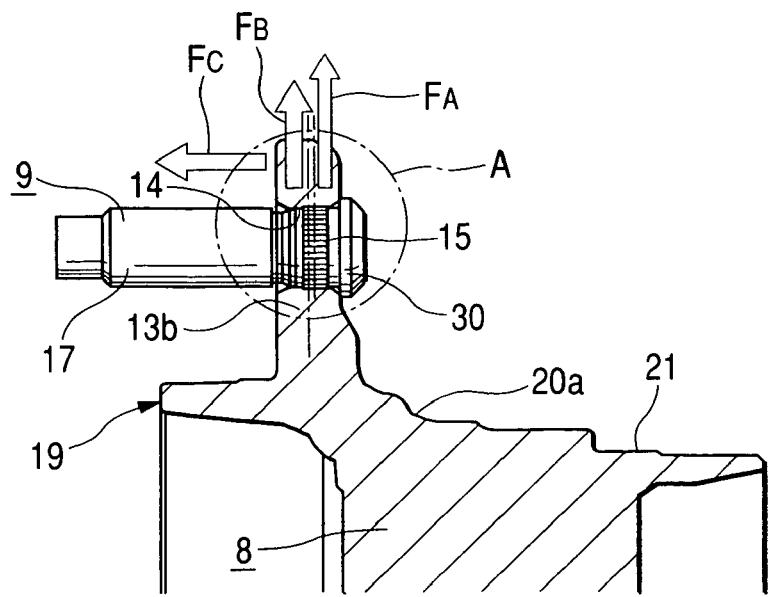
FIG. 3 is a sectional view showing a portion for explaining the forces, which are applied to the radially outer portion of a mounting flange as studs are press-fitted and fixed in the mounting flange.
Figure 4:
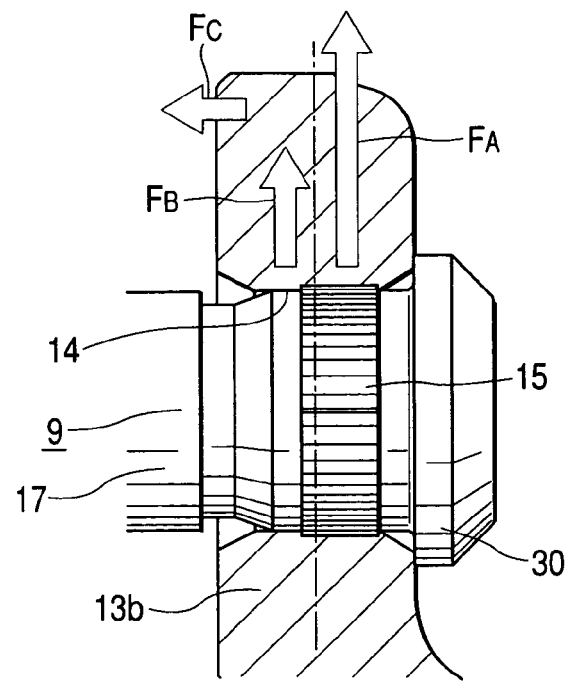
FIG. 4 is an enlarged view of portion A of FIG. 3.

Each of the studs, which have their root end portions press-fitted and fixed in the individual mounting holes 14 and 14 of the mounting flange 13b having the taper face 28a formed at the portion close to the its radially outer side face, is provided with: an outward flanged portion 30 at its root end portion (i.e., at the right-hand end portion of FIG. 3); the serrated portion 15 at its intermediate portion close to the root end; and an externally threaded portion 17 at its portion close to the intermediate portion or its leading end (i.e., at the left-hand end of FIG. 3). The individual studs 9 thus formed are inserted from the inner side face of the mounting flange 13b into the individual mounting holes 14 and 14 while being led by their externally threaded portions 17, to press-fit the serrated portions 15 into the individual mounting holes 14 and 14 and to bring the side face of the flanged portion 30 into abutment against the inner side face of the mounting flange 13b. In this state, the serrated portions 15 has its mounted position regulated so that it may be located at a position offset from the center to the other side face of the mounting flange 13b with respect to the thickness direction of the mounting flange 13b.

In the case of the wheel supporting rolling bearing unit of this embodiment, the taper face 28a is so formed at a portion of the outer side face of the mounting flange 13b as to extend from the pitch circuit γ of the individual mounting holes 14 and 14 to the outer circumference. Therefore, the deformation of the mounting flange 13b, which is caused as the serrated portions 15 of the individual studs 9 are press-fitted into the individual mounting holes 14 and 14, can be more reliably suppressed than that of the conventional structure described in the aforementioned JP-A-2003-25802. This point will be described in more detailed with reference to FIGS. 3 and 4.

As the serrated portion 15 of each stud 9 is press-fitted into the mounting hole 14, an outward force with respect to the radial direction of the mounting hole 14 is applied to the inner circumference of each mounting hole 14. The mounting flange 13b is not seriously deformed by an inward one of those forces with respect to the radial direction of the mounting flange 13b. This is because the mounting flange 13b has its inner circumference edge jointed and fixed to the body portion of the hub body 8 and given a high rigidity so that it is hardly deformed by the stress. On the contrary, the outer circumference edge of the mounting flange 13b is a freed end having no constraint so that the radially outer portion of the mounting flange 13b is easily deformed by outward forces $F_A$ and $F_B$ with respect to the radial direction of the mounting flange 13b.

In the case of this embodiment, the serrated portion 15 is located at a position offset from the center to the other side face of the mounting flange 13b with respect to the thickness direction of the mounting flange 13b, as described above. Of the outward forces $F_A$ and $F_B$, therefore, the force $F_A$ to act on the portion close to the other side face is higher, and the force $F_B$ to act on the portion close to the one side face is lower (i.e., $F_A > F_B$) Due to this difference between the forces $F_A$ and $F_B$, moreover, a force $F_C$ toward the one side face is applied to the radially outer portion of the mounting flange 13b so that the radially outer portion is deformed to the one side face. Our experiments have revealed that the starting point of that deformation is located between the pitch circle γ and the inscribed circle β of the individual mounting holes 14.

In case no countermeasure is made against such deformation, the radially outer portion of the one side face of the mounting flange 13b protrudes by the deformation based on that force $F_C$. This protrusion is heterogeneous with respect to the circumferential direction so that it causes the deflection of the side face of the rotor 2, which is jointed and fixed to that one side face, in the axial direction. According to the conventional structure described in the aforementioned JP-A-2003-25802, on the contrary, the deflection of the rotor 2 can be suppressed by suppressing the protrusion due to the deformation based on the force $F_C$, to a small value. However, the protrusion of the portion of the one side face radially inner than the circumscribed circle a cannot be suppressed to make the deflection preventing effect insufficient.

In the case of this embodiment, on the contrary, the inner circumference edge of the taper face 28a is made to exist in the portion of the pitch circle γ of each of the mounting holes 14 and 14. Therefore, the protrusion, as caused by the deformation based on the force $F_C$, of the radially outer portion of the one side face of the mounting flange 13b can be suppressed to a zero (including a minus, i.e., the state in which the portion is recessed, as compared with the radially inner portion) or a little. As a result, the rotor 2 to be jointed and fixed to the one side face of the mounting flange 13b can be effectively suppressed from being deflected in the axial direction on the basis of the deformation of the radially outer portion of the one side face of the mounting flange 13b, thereby to prevent the vibrations accompanied by uncomfortable noises, as called the judder, from being caused at a braking time. Moreover, the taper face 28a is formed all over the circumference of the mounting flange 13b so that the taper face 28a can be easily lathe-turned to make the structure capable of preventing the judder while suppressing the deflection, at a low cost.

Here, in order that the judder may be prevented by forming the taper face 28a, it is necessary that the radially outer portion of the one side face of the mounting flange 13b is not protruded from the virtual plane x irrespective of the deformation based on the force $F_C$. This is because the one side face of the rotor 2 and the flat face 29 contact closely each other such that the mounting flange 13b and the rotor 2 are intensely clamped between the flanged portions 30 of the studs 9 and nuts 10 (as referred to FIG. 10). Unless the radially outer portion of the one side face abuts in this state against the one side face of the rotor 2, the deformation based on the force $F_C$ does not lead to the deflection of the rotor 2. Unless the radially outer portion of the one side face of the mounting flange 13b protrudes from the virtual plane x, as described above, it does not abut against the one side face of the rotor 2 so that the deformation based on the force $F_C$ does not lead to the deflection of the rotor 2.

Therefore, the inclination angle of the taper face 28a, i.e., the distance δ, as taken in the thickness direction of the mounting flange 13b, between the virtual plane x extending radially outward from the flat face 29 and the outer circumference edge of the taper face 28a restrains the radially outer portion of the one side face from abutting against the one side face of the rotor 2. In this case, it is sufficient for eliminating only the abutment to enlarge the distance δ. However, the mere elongation is not preferred, because the strength of the radially outer portion of the mounting flange 13b drops. Therefore, the distance δ is determined to a value slightly larger than the deformation based on the force $F_C$ by considering this deformation.

Thus, the operation to determine the distance δ is specified by press-fitting the serrated portions 15 of the individual studs 9 actually into the individual mounting holes 14 and 14 of the mounting flange 13b. At first, there are measured the deforming direction and the deformation, which are obtained as the serrated portions 15 of the individual studs 9 are press-fitted into the individual mounting holes 14 and 14, of the radially outer portion of the one side face of the mounting flange 13b. And, this deformation, i.e., the size slightly larger than the axial displacement of the outer circumference edge of the mounting flange 13b is defined as the distance δ. And, the mounting flange 13b of an another wheel supporting roller bearing unit, in which the serrated portions 15 of the individual studs 9 are press-fitted under the identical conditions into the individual mounting holes 14 and 14, is lathe-turned on its one side at a radially outer portion to reach the outer circumference edge of the mounting flange 13b and throughout the circumference of the mounting flange 13b, before the serrated portions 15 are press-fitted into the individual mounting holes 14 and 14, thereby to form the taper face 28a throughout the circumference. After this, the serrated portions 15 of the individual studs 9 are press-fitted into the individual mounting holes 14 and 14. Here in the case of the general wheel supporting roller bearing unit for an automobile, the aforementioned distance δ is determined within the range of about 10 to 70 microns (μm) according to the aforementioned deformation, as has been described hereinbefore. Here, the generator shape (or the sectional shape) of the taper face 28a is preferred to be linear for facilitating the working operation, but may be exemplified by an arc of a large radius of curvature.

Embodiment 2

Figure 5:
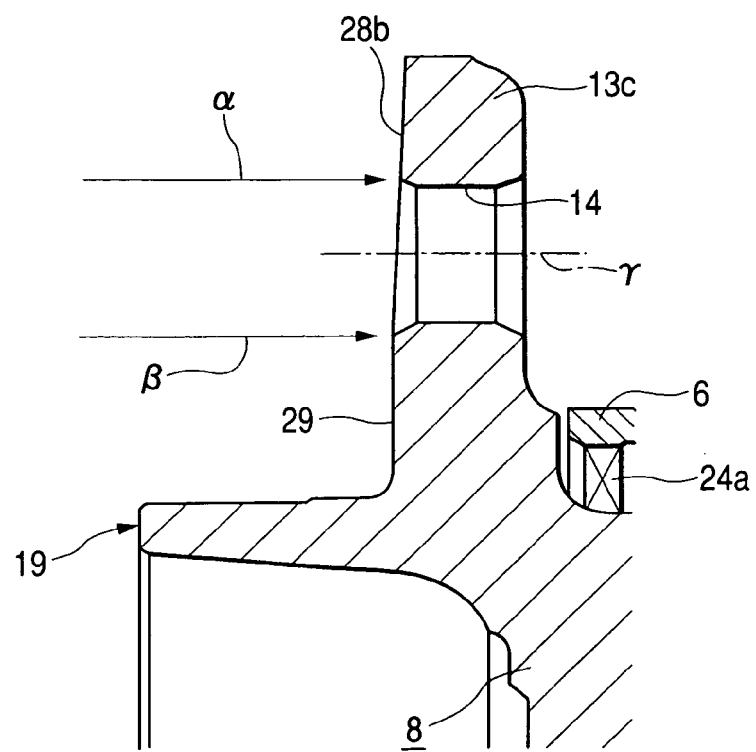
FIG. 5 is a sectional view showing a portion of Embodiment 2 of the invention.

FIG. 5 shows Embodiment 2 of the invention. In the case of this embodiment, too, at the radially outer portion of one side face (or the outer side face) of a mounting flange 13c, there is formed a taper face 28b, which is inclined to come the closer to the other side face of the mounting flange 13c as it goes the farther to the radially outer side. Especially in the case of this embodiment, this taper face 28b has its inner circumference edge located at the portion of the inscribed circle β of the individual mounting holes 14. Even if the radially inner portion of the one side face of the mounting flange 13c than the pitch circle γ of the individual mounting holes 14 is deformed as the serrated portions of the studs 9 are press-fitted into the individual mounting holes 14, therefore, that radially inner portion hardly causes the deflection of the rotor 2 (as referred to FIG. 10). The remaining constructions and actions are similar to those of the aforementioned Embodiment 1.

Embodiment 3

Figure 6:
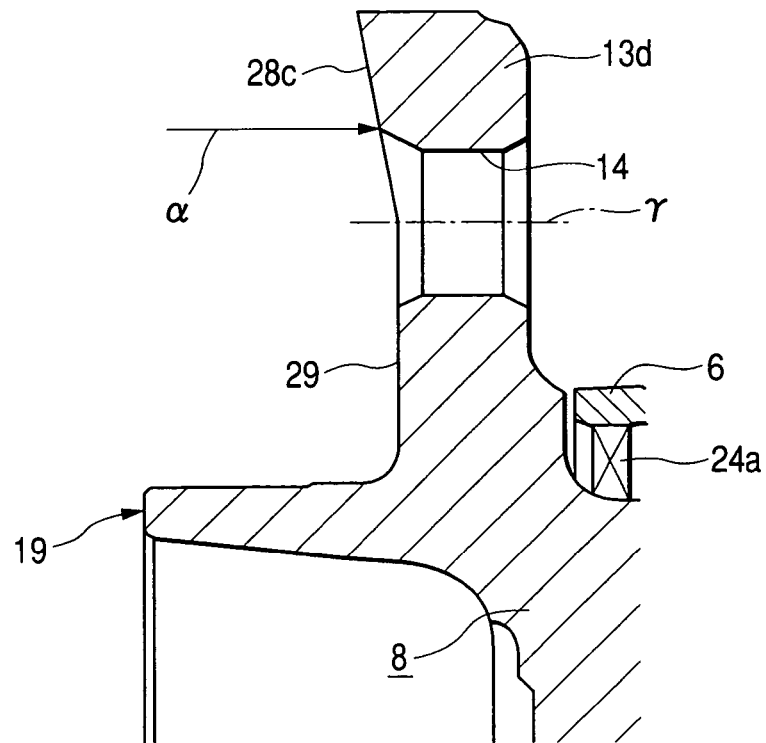
FIG. 6 is a sectional view showing a portion of Embodiment 3 of the invention.
Figure 7:
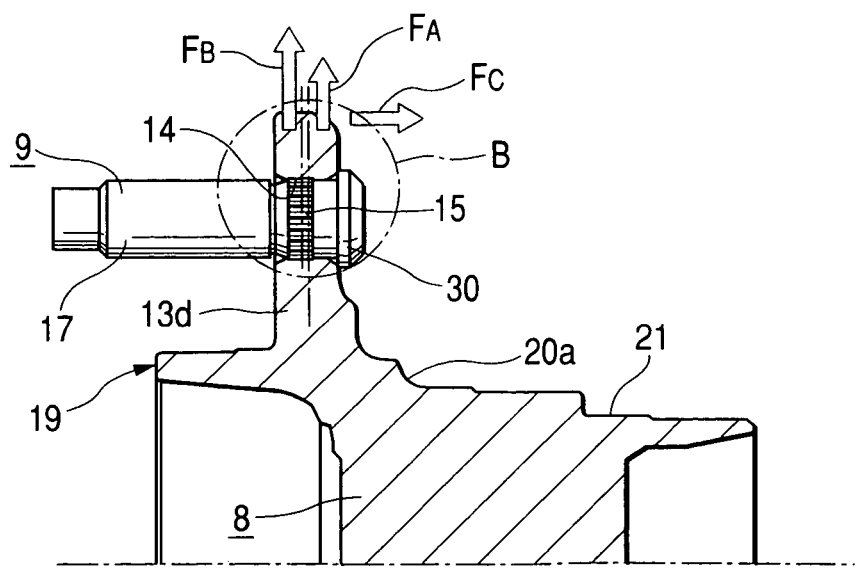
FIG. 7 is a sectional view showing a portion for explaining the forces, which are applied to the radially outer portion of a mounting flange as studs are press-fitted and fixed in the mounting flange.
Figure 8:
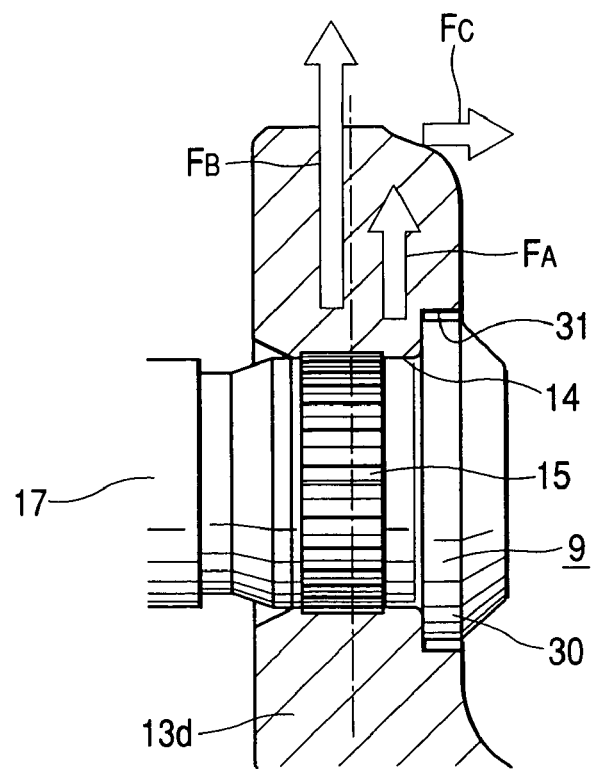
FIG. 8 is an enlarged view of portion B of FIG. 7.

FIGS. 6 to 8 show Embodiment 3 of the invention. In the case of this embodiment, with the flanged portions 30 formed at the root end portions of the individual studs 9 being in abutment against a mounting flange 13d, the serrated portions 15 of the individual studs 9 are located at positions offset from the center to the one side face of the mounting flange 13d with respect to the thickness direction of the mounting flange 13d. For this offset location, the serrated portions 15 are formed closer to the centers of the studs 9, as shown in FIG. 7, or counter-sunk portions 31 are formed around the other side openings of the mounting flange 13d of the two end openings of the mounting holes 14, as shown in FIG. 8. In either case, the radially outer portion of the mounting flange 13d is deformed toward the other side face as the serrated portions 15 are press-fitted into the individual mounting holes 14. In addition, in the case of this embodiment, at the radially outer portion of the one side face of the mounting flange 13d, there is formed a taper face 28c, which is inclined in a direction to go the farther from the outer side face of the mounting flange 13d as its goes the farther to the radially outer side.

In the case of this embodiment, of the outward forces $F_A$ and $F_B$ to be applied to the radially outer portion of the mounting flange 13d as the serrated portions 15 are press-fitted in the individual mounting holes 14, the force $F_A$ to act on the portion close to the other side face is lower, and the force $F_B$ to act on the portion close to the one side face is higher (i.e., $F_A < F_B$). Due to this difference between the forces $F_A$ and $F_B$, moreover, the force $F_C$ toward the other side face is applied to the radially outer portion of the mounting flange 13d so that the radially outer portion is deformed to the side face. In the case of this embodiment, the taper face 28c is inclined in such a direction that it goes the farther from the other side face of the mounting flange 13d as it goes the closer to the radially outer side. Despite of that deformation, therefore, the radially outer portion of the one side face of the mounting flange 13d is not excessively recessed with respect to the flat face 29 which is formed in the radially inner portion of that one side face.

In this case of the embodiment, the inclination angle of the taper face 28c is made so gentle (i.e., smaller than that of Embodiment 1) that the radially outer portion of the one side face of the mounting flange 13d may not be protruded from the virtual plane, which is extended radially outward from the flat face 29 of the radially inner portion, by the deformation of the mounting flange 13d based on the force $F_C$. Here in the case of this embodiment, the deflection of the rotor 2 (FIG. 10), as jointed and fixed to the one side face of the mounting flange 13d, can be suppressed even if the taper face 28c is not formed. Therefore, this taper face 28c has no significant meaning in the aspect of suppressing the deflection. By forming the taper face 28c, however, it is possible to improve the strength of the radially outer portion of the mounting flange 13d.

Embodiment 4

Figure 9:
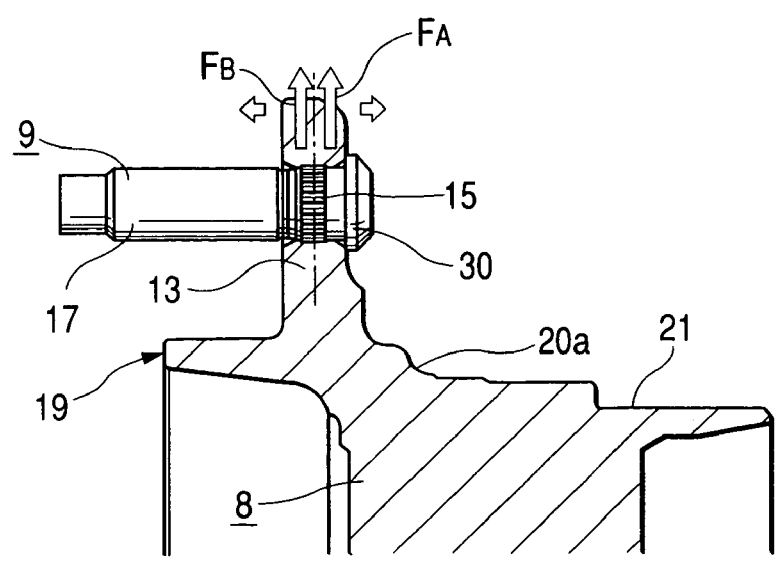
FIG. 9 is a sectional view showing a portion of Embodiment 4 of the invention.

FIG. 9 shows Embodiment 4 of the invention. In the case of this embodiment, with the flanged portions 30 formed at the root end portion of the being in abutment against a mounting flange 13, the serrated portions 15 of the individual studs 9 are located at the center position with respect to the thickness direction of the mounting flange 13. In the case of this embodiment, therefore, of the outward forces $F_A$ and $F_B$ to be applied to the radially outer portion of the mounting flange 13 as the serrated portions 15 are press-fitted into the individual mounting holes 14, the force $F_A$ to act on the portion close to the other side face and the force $F_B$ to act on the portion close to the one side face are substantially equal to each other ($F_A \approx F_B$). Therefore, the deformation of the radially outer portion of the mounting flange 13 to follow the aforementioned press-fit is zero or a little. In this case, however, it cannot be denied that the radially outer portion may be deformed to the one side face by the manufacturing error or the like. If a taper face having a smaller inclination angle (i.e., a small distance δ) than that of the case of Embodiment is formed at the radially outer portion of the mounting flange 13, therefore, the deflection of the rotor jointed and fixed to the one side face of the mounting flange 13 can be suppressed irrespective of that manufacturing error or the like.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

Here, the present invention resides in that, irrespective of the deformation of the mounting flange accompanying the press-fit and fixture of the studs to the mounting flange formed at the hub, the rotor jointed and fixed to the mounting flange is prevented from being deflected in the axial direction. No specific limit is made to the support structure of the hub. Therefore, the invention can be practiced not only by the inner ring rotation type (i.e., the structure, in which the hub is the inner ring), as shown, but also by the outer ring rotation type (i.e., the structure, in which the hub is the outer ring).

What is claimed is:

1. A wheel supporting roller bearing unit comprising:
a hub including a mounting flange on its outer circumference, said mounting flange having a plurality of mounting through holes;
a plurality of studs respectively press-fitted in the mounting through holes, each stud having a flanged portion at its root end portion and having a threaded leading end portion, in such manner that a disk brake rotor superposed over one side face of said mounting flange can be jointed and fixed by threadedly engaging the threaded leading end portions of the studs with nuts respectively,
wherein said mounting flange has a portion on which said rotor is superposed, the portion is close to the outer circumference of said one side face and reaches the outer circumference edge of said mounting flange, and the portion includes a taper face extending throughout the circumference of said mounting flange,
wherein said taper face is inclined in such a direction prior to said individual studs being press-fitted and fixed in said individual mounting holes that the taper face tapers away from or close to said rotor, and
wherein the inner circumference edge of said taper face exists between a circumscribed circle and an inscribed circle of said individual mounting holes.

2. A wheel supporting roller bearing unit according to claim 1, wherein the distance, as taken in a thickness direction of said mounting flange, between a virtual plane extending radially outward from the radially inner portion of the one side face of said mounting flange and the outer circumference edge of said taper face is determined within a range of 10 to 70 µm according to the deformation of said mounting flange, which is based on the press-fit of said studs into said individual mounting holes.

3. A wheel supporting roller bearing unit according to claim 1, wherein the inner circumference edge of said taper face exists between the pitch circle of said individual mounting holes and the inscribed circle of said individual mounting holes.

4. A wheel supporting roller bearing unit according to claim 2, wherein the inner circumference edge of said taper face exists between the pitch circle of said individual mounting holes and the inscribed circle of said individual mounting holes.

5. A method for manufacturing a wheel supporting roller bearing unit including: a hub having a mounting flange on its outer circumference for rotating when in use; a plurality of mounting holes formed partially of said mounting flange and extending axially through said mounting flange; a plurality of studs adapted to be press-fitted and fixed in the individual mounting holes, so that a disk brake rotor superposed over one side face of said mounting flange is jointed and fixed for use to said mounting flange with flanged portions formed at the root end portions of the individual studs and nuts fastened to the leading end portions of the individual studs, the method comprising:

measuring a direction and extent of a deformation, as caused by press-fitting said individual studs into said individual mounting holes, of the radially outer portion of the one side face of said mounting flange;

machining the mounting flange of another wheel supporting roller bearing unit, in which said individual studs are press-fitted under the identical conditions into the individual mounting holes, on its one side at the radially outer portion to reach the outer circumference edge of said mounting flange and throughout the circumference of said mounting flange, before said individual studs are press-fitted into said individual mounting holes, thereby to form a taper face inclined oppositely of said deformation direction and having its inner circumference edge existing between a circumscribed circle and an inscribed circle of said individual mounting holes and reaching the outer circumference edge of said mounting flange; and subsequently press-fitting and fixing said individual studs into said individual mounting holes.

6. A method for manufacturing a wheel supporting roller bearing unit according to claim 5, wherein said taper face is formed by a lathe-turning after the components of the roller bearing unit excepting the individual studs were assembled up and before said individual studs are press-fitted and fixed in the individual mounting holes.

7. A wheel supporting roller bearing unit comprising:
a hub including a mounting flange with a plurality of mounting through holes; and
a plurality of studs to be press-fitted in the mounting through holes respectively, each stud having a flanged portion at its root end portion and having a threaded leading end portion, in such manner that a disk brake rotor superposed over a side face of said mounting flange can be jointed and fixed by threadedly engaging the threaded leading end portions of the studs with nuts respectively, wherein the mounting flange has a tapered surface formed on its side face, and said mounting flange is operable to effect a deformation caused when press-fitting the studs to the holes during assembly, and wherein an inner circumference edge of said tapered surface is disposed between a circumscribed circle and an inscribed circle that are defined by the mounting through holes.

8. The wheel supporting roller bearing unit according to claim 7, wherein said tapered surface extends up to an outer circumference edge of the mounting flange.

9. The wheel supporting roller bearing unit according to claim 8, wherein the tapered surface is inclined relative to the a plane perpendicular to an axial direction of the bearing unit.

10. The wheel supporting roller bearing unit according to claim 8, wherein the side face of said mounting flange has a non-tapered surface at its inner circumferential side.

11. The wheel supporting roller bearing unit according to claim 10, wherein a distance between the rotor and the mounting flange created by the taper is between 10 to 70 μm.

12. The wheel supporting roller bearing unit according to claim 7, wherein the tapered surface is angled towards or away from the rotor based on insertion direction of the stud.

* * * * *